United States Patent [19]

Schmidt

[11] Patent Number: 4,678,991
[45] Date of Patent: Jul. 7, 1987

[54] INDUCTIVE DISPLACEMENT TRANSDUCER WITH UNIPOLAR OUTPUT

[75] Inventor: Samuel Schmidt, Enfield, Conn.

[73] Assignee: United Technologies Corporation, Hartford, Conn.

[21] Appl. No.: 799,534

[22] Filed: Nov. 18, 1985

[51] Int. Cl.$^4$ .................. G08C 19/08; G01B 7/14
[52] U.S. Cl. ............................... 324/207; 318/657; 324/208; 336/130; 340/870.36
[58] Field of Search ............ 324/207, 208, 241; 318/656–660; 336/130, 134; 340/870.35, 870.36

[56] References Cited

U.S. PATENT DOCUMENTS

| | | | |
|---|---|---|---|
| 3,281,809 | 10/1966 | Andersson | 340/870.35 |
| 3,456,132 | 7/1969 | Dechelotte | 324/208 X |
| 3,569,820 | 3/1971 | Nishimuta | 336/130 X |
| 4,000,448 | 12/1976 | Shum et al. | 324/207 X |
| 4,358,762 | 11/1982 | Wolf et al. | 340/870.35 |

*Primary Examiner*—Gerard R. Strecker
*Attorney, Agent, or Firm*—Dominic J. Chiantera

[57] ABSTRACT

A unipolar signal indication of core position is provided in an inductive displacement transducer, such as an LVDT, as the sum magnitude of the transducer's applied primary winding voltage signal and the transducer's induced secondary winding voltages.

8 Claims, 4 Drawing Figures

INDUCTIVE DISPLACEMENT TRANSDUCER WITH UNIPOLAR OUTPUT

DESCRIPTION

1. Technical Field

This invention relates to inductive displacement transducers such as linear variable differential transformers (LVDT) and rotary variable differential transformers (RVDT), and more particularly to transducers having unipolar signal outputs.

2. Background Art

Inductive displacement transducers, such as LVDTs and RVDTs are well known in the art for use in indicating the relative position of displacement devices, such as actuators. In this application they are connected in closed loop fashion with control circuitry to sense the actuator's displacement in response to the control circuitry command, and to provide a sensed position feedback signal to the control to null the loop at the desired actuator position.

The typical prior art transducer includes a primary winding and two symmetrically spaced secondary windings mounted on a common bobbin. The secondary windings are series opposed. A movable core, which includes a linear magnetic material element in the LVDT configuration and an eccentrically mounted magnetic cam in the RVDT, is positioned within a central, coaxial air gap of the bobbin and connected to the actuator shaft. With an AC voltage signal applied to the primary winding, voltages are induced by mutual inductance in each of the secondary windings.

Movement of the core with actuator displacement changes the level of mutual inductance and the magnitude of the induced voltage. As the core moves off center the mutual inductance between the primary and one of the secondary windings will be greater than the other. If the secondary windings are electrically connected in series opposition, a bipolar differential voltage appears across the two as the core moves to its extreme positions. At the central position the secondary winding voltages are equal and opposite, and the differential voltage is zero, i.e. a null. The differential output voltage is essentially linear between positive and negative maximum values around the null.

When inductive displacement transducers are used in avionic or electronic engine control equipment a unipolar signal output is preferred. One reason is system reliability. In a bipolar transducer the null signal cannot be distinguished from a failure which produces a zero output. In a unipolar transducer the output voltage is single polarity, and signal magnitude varies between minimum and maximum values with core travel; it never nulls. Occurrence of a null indicates a transducer failure. A second reason is that the demodulator must be phase sensitive to distinguish a bipolar signal value on either side of null. Phase sensitive demodulators are costly, complicated, and less reliable.

In the prior art a unipolar output is achieved either by using a bipolar transducer over one-half of its range, or by using a tertiary winding unipolar transducer. Using a bipolar transducer over half of its range is, in most instances, an unacceptable choice. It is highly inefficient in terms of physical size and cost, since the ratio of case length-to-stroke length is unacceptably high.

In the tertiary winding transducer, a third series winding is added in phase with one of the two series opposed secondary windings (and out of phase with the other). This electrically shifts the signal output-to-core displacement relationship so that the output voltage null no longer occurs at the center core position, but occurs at a core position near one extreme of travel. The tertiary winding transducer provides direct unipolar output in two wires instead of four; similar to the bipolar device. It does, however, require complex transducer construction, which is expensive and less reliable.

DISCLOSURE OF INVENTION

The object of the present invention is to provide an inductive displacement transducer with two secondary windings and a unipolar signal indication of core displacement.

According to the present invention, a unipolar inductive displacement transducer includes a bobbin with a coaxial air gap, a movable magnetic material core adapted for displacement through the air gap, a primary winding disposed on the bobbin and connected between first and second transducer terminals, and two oppositely phased secondary windings disposed on the bobbin and series connected between the first terminal and a third transducer terminal, for providing oppositely phased secondary voltage signals by mutual induction of an excitation signal applied to the first and second transducer terminals, the secondary voltage signals varying oppositely in amplitude between minimum and maximum values with core displacement to provide at the second and third transducer terminals a unipolar signal indication of core position as the sum magnitude of the excitation signal and the series opposed secondary signals.

The inductive displacement transducer of the present invention provides a unipolar output indication of core displacement with one primary and two secondary windings. The unipolar output is provided on two wires as opposed to the four required with signal conditioning of the two secondary windings. Similarly, the unipolar output is provided without addition of a third winding.

These and other objects, features, and advantages of the present invention will become more apparent in light of the following detailed description of a preferred embodiment, as illustrated in the accompanying Drawing.

BEST MODE FOR CARRYING OUT THE INVENTION

Figure 4:
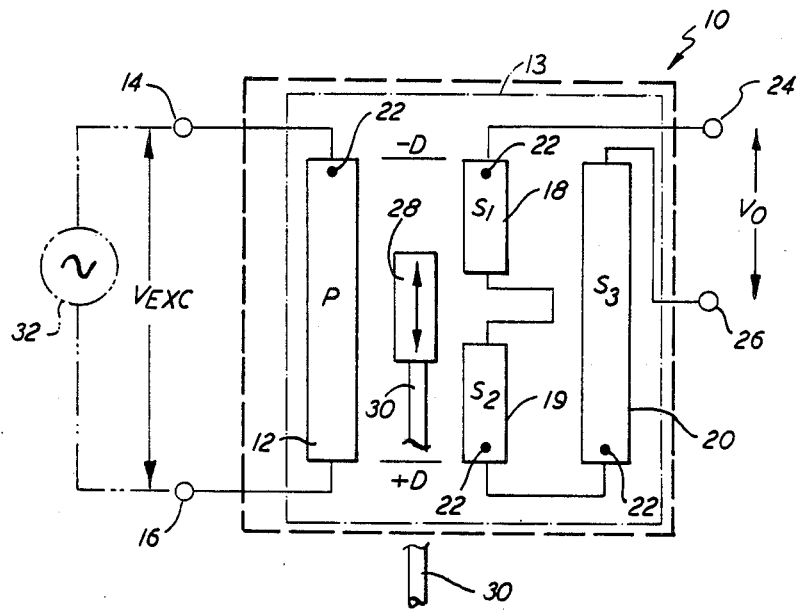
FIG. 4 is a simplified schematic illustration of a prior art unipolar displacement transducer.

Referring first to FIG. 4, which is a simplified schematic illustration of a prior art tertiary winding displacement transducer 10. The prior art transducer includes a primary winding 12 wound on a transducer bobbin assembly 13 (shown schematically, in phantom) and connected on opposite ends to first and second transducer terminals 14, 16. Three secondary windings 18-20 (alt. $S_1$, $S_2$, $S_3$) are similarly disposed on the bobbin assembly, more or less symmetrical with the primary winding 12. The secondary windings are series connected with two windings ($S_1$, $S_3$) connected in phase with each other and with the primary winding 12, as shown generally by the phase dots 22. The series connected secondary windings are connected on opposite ends to the transducer output terminals 24, 26. A magnetic material, movable core 28 is connected to a displaceable shaft 30, which is mounted to the particular device whose position is to be monitored, e.g. actuator.

With application of an AC excitation signal ($V_{EXC}$) from a source 32 (shown in phantom) the output voltage between terminals 24, 26 is equal to the sum of the secondary voltages induced in each of the three secondary windings. Considering the secondary winding phases, $$V_O = (V_{S1} + V_{S3}) - V_{S2}$$

The magnitude of the secondary voltages varies between maximum and minimum values, depending on the actual core position within the air gap. Assuming that at one extreme of core travel (+D) that the first winding voltage ($V_{S1}$) is at a maximum, that the second winding voltage ($V_{S2}$) is at a minimum, and that winding voltage ($V_{S3}$) is at some value selected so as to produce a maximum $V_O$ output value. At the opposite extreme of travel (−D) the $S_1$ and $S_2$ winding voltages are opposite in magnitude, and the third winding is again chosen to provide a minimum $V_O$ (near zero). The output voltage is, therefore, unipolar; all of which is known.

Figure 1:
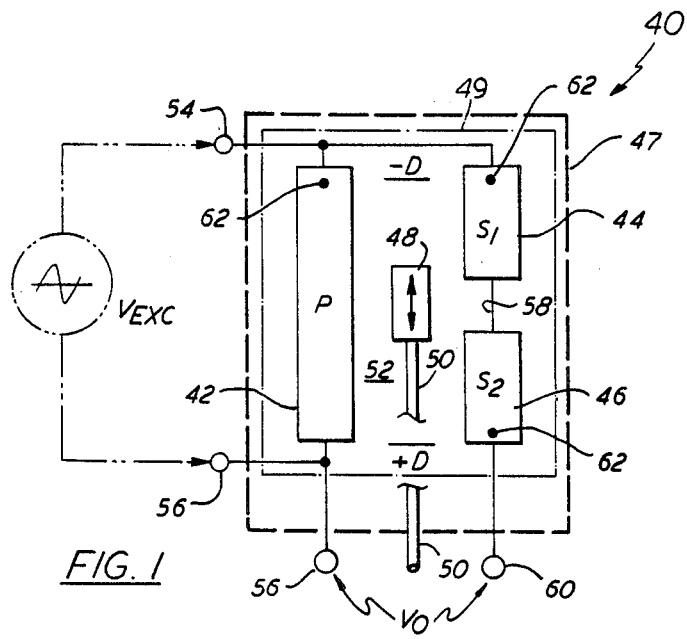
FIG. 1 is a simplified schematic illustration of one embodiment of the unipolar displacement transducer of the present invention.

Referring now to FIG. 1, in a simplified schematic illustration of the best mode embodiment of the inductive displacement transducer 40 of the present invention, the transducer elements include a primary winding 42 and two series connected secondary windings 44, 46 (alt. $S_1$, $S_2$), all wound on a common bobbin assembly 49 (shown schematically, in phantom); all enclosed within a housing 47. As with prior art devices, the transducer further includes a magnetic material core 48 having a displaceable mechanical shaft 50. The core is movable through an air gap 52 which is coxial with the central axis of the bobbin assembly. The shaft 50 extends outside the housing 47 and is adapted for connection to the device whose position is to be monitored. The extremes of core travel are illustrated as +D and −D, or a total range of 2D.

Thus far, the description of the transducer's configuration is the same as that of prior art bipolar transducers. The difference, however, lies in the physical electrical connection of the primary winding 42 to the series connected secondary windings 44, 46. This represents the point of departure of the present transducer from prior art transducers which do not include electrical connection of the primary and series connected secondary windings. As shown, the primary winding 42 (P) is connected on opposite ends to first and second transducer input terminals 54, 56. The secondary winding 44 ($S_1$) is connected in series through line 58 with secondary winding 46 ($S_2$). One end of the series connected windings is connected to the first terminal 54, with the primary, and the other end is connected to a third transducer terminal 60. Phasing dots 62 illustrate the relative phasing between the primary P and the secondary windings $S_1$, $S_2$.

Figure 3:
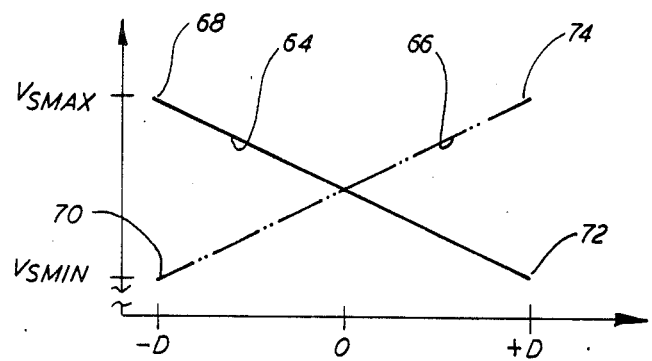
FIG. 3 is a graphic illustration of another functional characteristic of the embodiment of FIG. 1.

In the operation of the present transducer the magnitude of the voltage signal measured between the second and third terminals 56, 60 is the sum of a primary winding excitation voltage signal $V_{EXC}$ provided from an AC signal source 63 (shown in phantom), and the series opposed secondary windings. The magnitude of the induced secondary voltage signals varies with core position as in the prior art transducers. Each secondary signal varies between a $V_{S\,MAX}$ value and a $V_{S\,MIN}$ value with the core 48 between the +D and −D extremes of travel. FIG. 3 is a simplified illustration of the change in secondary signal amplitude with displacement. As shown the signal is substantially linear over the range of core travel between −D and +D. Assume the voltage signal for secondary winding $S_1$ is waveform 64 and that for the winding $S_2$ is waveform 66 (shown in phantom for ease of illustration).

With the core at the extreme −D position the $S_1$ voltage $V_{S1}$ across winding 44 is a maximum ($V_{S\,max}$) and the $S_2$ voltage $V_{S2}$ across winding 46 is a minimum ($V_{S\,min}$). At the +D position the reverse occurs with $V_{S1} = V_{S\,MIN}$ and $V_{S2} = V_{S\,MAX}$.

Since the output voltage $V_O$ between terminals 60, 56 is equal to the sum of the $V_{EXC}$ excitation signal and the secondary voltage signals, or:

$$V_O = V_{EXC} - V_{S1} + V_{S2},$$

at the +D core position $V_{S1} = V_{S\,MIN}$ and $V_{S2} = V_{S\,MAX}$, so that:

$$V_O = V_{EXC} - V_{S\,MIN} + V_{S\,MAX}.$$

If $V_{FS}$ is the full scale differential voltage across each of the $S_1$, $S_2$ secondaries, then $$V_{FS} = V_{S\,MAX} - V_{S\,MIN}$$

and $$V_O = V_{EXC} + V_{FS}.$$

At a core position of −D $$V_O = V_{EXC} - V_{S\,MAX} + V_{S\,MIN}$$

or $$V_O = V_{EXC} - V_{FS}.$$

Figure 2:
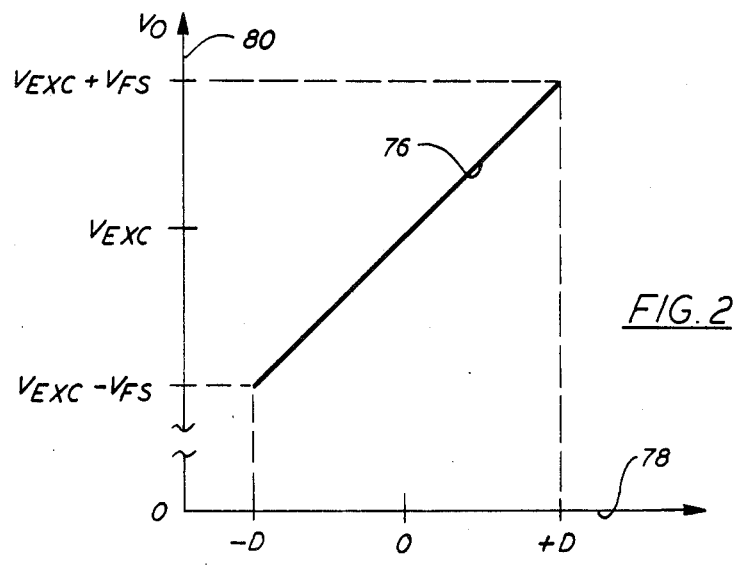
FIG. 2 is a graphic illustration of one functional characteristic of the embodiment of FIG. 1.

FIG. 2 illustrates the transducer transfer function 76, with displacement D along the abscissa 78 and output voltage $V_O$ along the ordinate 80.

The transducer excitation $V_{EXC}$ is typically a low amplitude AC signal; perhaps less than 10.0 VRMS. The excitation signal frequency is chosen to provide minimum phase shift between the primary and secondary windings. Frequencies in the range of 2.0 kHz to 5.0 kHz provide near zero phase shift. As a result the primary and secodary signals are directly additive. The minimum output of $V_O = V_{EXC} - V_{FS}$ is always greater than zero since the primary to secondary transformation ratio is no greater than 1.0. As a typical example, with a 6.0 VRMS value of $V_{EXC}$, $V_{FS}$ is typically 2.0 VRMS with a $V_{S\,MAX}$ of 3.0 VRMS and a $V_{S\,MIN}$ of 1.0 VRMS. The total output range is 6.0±2.0 VRMS, or 4.0–8.0 VRMS for the displacement range of 2D (−D to +D).

The displacement transducer of the present invention may be embodied in any of the known prior art physical housings, configurations etc. Similarly it may be fabricated using any of the known methods and processes, using materials used in the manufacture of LVDT and RVDT devices, as may be known to those skilled in the art.

Similarly, although the present invention has been shown and described with respect to a best mode embodiment thereof, it should be understood by those skilled in the art that the foregoing and various other changes, omissions, and additions in the form and detail thereof may be made therein without departing from the spirit and scope of the invention.

That which I claim as novel and desire to secure by Letters Patent is:

1. Apparatus for providing a signal indication of the position of the shaft of a controlled displacement device, within a range of displacement, in a system having a source of alternating current (AC) voltage excitation signals, comprising:
   a housing; and
   an inductive displacement transducer enclosed within said housing and having a bobbin assembly with a central air gap, a movable magnetic core having a shaft extending through said housing and adapted for movement through said air gap in response to movement of said shaft, a primary winding disposed on said bobbin and connected through first and second transducer terminals to the source of AC voltage excitation signals, and two series opposed secondary windings disposed on said bobbin and connected between said first terminal and a third transducer terminal, in series with said primary winding, for providing oppositely phased secondary voltage signals by transformation of the primary winding AC voltage excitation signal at said first and second terminals, said secondary voltage signals varying oppositely in amplitude between minimum and maximum values in response to displacement of said core through said air gap, to provide the sum magnitude of said primary winding signal and said series opposed secondary signals, as a unipolar signal indication of core position over the range of displacement, at said second and third terminals.

2. The apparatus of claim 1, wherein transformation of said primary excitation signal into said secondary voltage signals occurs at a transformation ratio not greater than 1.0.

3. The apparatus of claim 1 or 2, wherein said inductive displacement transducer is a linear variable differential transformer (LVDT).

4. The apparatus of claim 1 or 2, wherein said inductive displacement transducer is a rotary variable differential transformer (RVDT).

5. The apparatus of claim 1, wherein said primary AC voltage excitation signal is at a magnitude not greater than 10.0 VRMS.

6. The apparatus of claim 1, wherein said primary AC voltage excitation signal is at a frequency in the range of from 2.0 kHz to 5.0 kHz.

7. The method for providing a unipolar output signal indication of core position over a range of displacement within a linear variable differential transformer (LVDT) having a primary winding connected between first and second transducer terminals, and having two series opposed secondary windings, comprising the steps of:
   applying an excitation signal to the first and second transducer terminals;
   electrically connecting said series opposed secondary windings between the first transducer terminal and a third transducer terminal; and
   measuring, as the unipolar signal indication of core position, the voltage signal magnitude between the first transducer terminal and said third transducer terminal.

8. The method for providing a unipolar output signal indication of core position over a range of displacement within a rotary variable differential transformer (RVDT) having a primary winding connected between first and second transducer terminals, and having two series opposed secondary windings, comprising the steps of:
   applying an excitation signal to the first and second transducer terminals;
   electrically connecting said series opposed secondary windings between the first transducer terminal and a third transducer terminal; and
   measuring, as the unipolar signal indication of core position, the voltage signal magnitude between the first transducer terminal and said third transducer terminal.

* * * * *

UNITED STATES PATENT AND TRADEMARK OFFICE
CERTIFICATE OF CORRECTION

PATENT NO. : 4,678,991

DATED : July 7, 1987

INVENTOR(S) : Samuel Schmidt

It is certified that error appears in the above-identified patent and that said Letters Patent is hereby corrected as shown below:

Column 3, line 40 "coxial" should read --coaxial--

Column 4, line 14 "$(V_{S\ max})$" should read --$(V_{S\ MAX})$--

Column 4, line 16 "$(V_{S\ min})$" should read --$(V_{S\ MIN})$--

Column 4, line 56 "secodary" should read --secondary--

Signed and Sealed this

Thirty-first Day of July, 1990

*Attest:*

HARRY F. MANBECK, JR.

*Attesting Officer*   *Commissioner of Patents and Trademarks*